United States Patent [19]

Iwabuchi et al.

[11] Patent Number: 5,657,399
[45] Date of Patent: Aug. 12, 1997

[54] ENCODING/DECODING APPARATUS USING QUANTIZING STEPS INFORMATION

[75] Inventors: Yoshitsugu Iwabuchi, Tokyo; Kenichi Nagasawa, Kawasaki, both of Japan

[73] Assignee: Canon Kabushiki Kaisha, Tokyo, Japan

[21] Appl. No.: 882,618

[22] Filed: May 13, 1992

[30] Foreign Application Priority Data

| May 17, 1991 | [JP] | Japan | 3-113190 |
| May 17, 1991 | [JP] | Japan | 3-113228 |

[51] Int. Cl.⁶ ............... H04N 1/41; H04N 1/415
[52] U.S. Cl. ............ 382/248; 382/250; 382/251; 358/432; 358/433
[58] Field of Search ............... 358/433, 432, 358/426, 539, 467, 341, 400, 405, 406, 435, 436; 371/71; 348/405, 419, 420, 403; 382/248, 250, 251

[56] References Cited

U.S. PATENT DOCUMENTS

| 4,186,415 | 1/1980 | Takayama . | |
| 4,189,748 | 2/1980 | Reis | 358/133 |
| 4,807,033 | 2/1989 | Keesen et al. | 358/167 |
| 4,831,659 | 5/1989 | Miyaoka | 358/433 |
| 4,982,282 | 1/1991 | Saito et al. | 358/133 |
| 4,999,704 | 3/1991 | Ando | 358/133 |
| 5,051,840 | 9/1991 | Watanabe et al. | 358/433 |
| 5,070,503 | 12/1991 | Shikakura | 371/37.1 |
| 5,086,488 | 2/1992 | Kato et al. | 382/250 |
| 5,136,371 | 8/1992 | Savatier et al. | 358/133 |
| 5,142,537 | 8/1992 | Kutner | 371/31 |
| 5,150,210 | 9/1992 | Hoshi et al. | 358/135 |
| 5,170,264 | 12/1992 | Saito et al. | 348/420 |
| 5,189,530 | 2/1993 | Fujii | 358/458 |
| 5,196,933 | 3/1993 | Henot | 358/433 |
| 5,212,549 | 5/1993 | Ng et al. | 358/135 |
| 5,216,516 | 6/1993 | Tanaka | 358/426 |
| 5,228,028 | 7/1993 | Cucchi et al. | 370/94.1 |
| 5,243,428 | 9/1993 | Challapali et al. | 358/167 |
| 5,247,363 | 9/1993 | Sun et al. | 358/167 |
| 5,251,029 | 10/1993 | Enari et al. | 358/133 |
| 5,264,942 | 11/1993 | Shimotsuji | 358/261.1 |
| 5,293,252 | 3/1994 | Kim | 358/432 |
| 5,301,040 | 4/1994 | Hoshi et al. | 358/465 |
| 5,353,059 | 10/1994 | Lawlor et al. | 348/398 |

FOREIGN PATENT DOCUMENTS

| 400756 | 12/1990 | European Pat. Off. | H04N 11/00 |
| 493128 | 7/1992 | European Pat. Off. | H04N 7/133 |

OTHER PUBLICATIONS

Signal Processing of HDTV II Sep. 1989, Turin, Italy pp. 769–776, R. Del Pero et al. "Criteria for the Protection of the Video Information In a Codec based on DCT".

Primary Examiner—Scott A. Rogers
Attorney, Agent, or Firm—Fitzpatrick, Cella, Harper & Scinto

[57] ABSTRACT

In an encoder/decoder, a quantizer quantizes input image information, and a coefficient generator generates coefficient information for determining quantization steps of the quantizer. An encoder variable length encodes the quantized image information, and a divider divides the quantized image information into a plurality of blocks. The coefficient information is attached to each of the plurality of blocks for transmission to a decoder.

26 Claims, 11 Drawing Sheets

| $D_{11}$ | $D_{12}$ | $D_{13}$ | $D_{14}$ | $D_{15}$ | $D_{16}$ | $D_{17}$ | $D_{18}$ |
|---|---|---|---|---|---|---|---|
| $D_{21}$ | $D_{22}$ | $D_{23}$ | $D_{24}$ | $D_{25}$ | $D_{26}$ | $D_{27}$ | $D_{28}$ |
| $D_{31}$ | $D_{32}$ | $D_{33}$ | $D_{34}$ | $D_{35}$ | $D_{36}$ | $D_{37}$ | $D_{38}$ |
| $D_{41}$ | $D_{42}$ | $D_{43}$ | $D_{44}$ | $D_{45}$ | $D_{46}$ | $D_{47}$ | $D_{48}$ |
| $D_{51}$ | $D_{52}$ | $D_{53}$ | $D_{54}$ | $D_{55}$ | $D_{56}$ | $D_{57}$ | $D_{58}$ |
| $D_{61}$ | $D_{62}$ | $D_{63}$ | $D_{64}$ | $D_{65}$ | $D_{66}$ | $D_{67}$ | $D_{68}$ |
| $D_{71}$ | $D_{72}$ | $D_{73}$ | $D_{74}$ | $D_{75}$ | $D_{76}$ | $D_{77}$ | $D_{78}$ |
| $D_{81}$ | $D_{82}$ | $D_{83}$ | $D_{84}$ | $D_{85}$ | $D_{86}$ | $D_{87}$ | $D_{88}$ |

F I G. 4 A

| $X_{11}$ | $X_{12}$ | $X_{13}$ | $X_{14}$ | $X_{15}$ | $X_{16}$ | $X_{17}$ | $X_{18}$ |
|---|---|---|---|---|---|---|---|
| $X_{21}$ | $X_{22}$ | $X_{23}$ | $X_{24}$ | $X_{25}$ | $X_{26}$ | $X_{27}$ | $X_{28}$ |
| $X_{31}$ | $X_{32}$ | $X_{33}$ | $X_{34}$ | $X_{35}$ | $X_{36}$ | $X_{37}$ | $X_{38}$ |
| $X_{41}$ | $X_{42}$ | $X_{43}$ | $X_{44}$ | $X_{45}$ | $X_{46}$ | $X_{47}$ | $X_{48}$ |
| $X_{51}$ | $X_{52}$ | $X_{53}$ | $X_{54}$ | $X_{55}$ | $X_{56}$ | $X_{57}$ | $X_{58}$ |
| $X_{61}$ | $X_{62}$ | $X_{63}$ | $X_{64}$ | $X_{65}$ | $X_{66}$ | $X_{67}$ | $X_{68}$ |
| $X_{71}$ | $X_{72}$ | $X_{73}$ | $X_{74}$ | $X_{75}$ | $X_{76}$ | $X_{77}$ | $X_{78}$ |
| $X_{81}$ | $X_{82}$ | $X_{83}$ | $X_{84}$ | $X_{85}$ | $X_{86}$ | $X_{87}$ | $X_{88}$ |

F I G. 4 B

| $W_{11}$ | $W_{12}$ | $W_{13}$ | $W_{14}$ | $W_{15}$ | $W_{16}$ | $W_{17}$ | $W_{18}$ |
|---|---|---|---|---|---|---|---|
| $W_{21}$ | $W_{22}$ | $W_{23}$ | $W_{24}$ | $W_{25}$ | $W_{26}$ | $W_{27}$ | $W_{28}$ |
| $W_{31}$ | $W_{32}$ | $W_{33}$ | $W_{34}$ | $W_{35}$ | $W_{36}$ | $W_{37}$ | $W_{38}$ |
| $W_{41}$ | $W_{42}$ | $W_{43}$ | $W_{44}$ | $W_{45}$ | $W_{46}$ | $W_{47}$ | $W_{48}$ |
| $W_{51}$ | $W_{52}$ | $W_{53}$ | $W_{54}$ | $W_{55}$ | $W_{56}$ | $W_{57}$ | $W_{58}$ |
| $W_{61}$ | $W_{62}$ | $W_{63}$ | $W_{64}$ | $W_{65}$ | $W_{66}$ | $W_{67}$ | $W_{68}$ |
| $W_{71}$ | $W_{72}$ | $W_{73}$ | $W_{74}$ | $W_{75}$ | $W_{76}$ | $W_{77}$ | $W_{78}$ |
| $W_{81}$ | $W_{82}$ | $W_{83}$ | $W_{84}$ | $W_{85}$ | $W_{86}$ | $W_{87}$ | $W_{88}$ |

ENCODING/DECODING APPARATUS USING QUANTIZING STEPS INFORMATION

BACKGROUND OF THE INVENTION

1. Field of the Invention

The present invention relates to an encoding/decoding apparatus. Image information is quantized, and then encoded. A decoder then decodes the encoded image information.

2. Related Background Art

For the purpose of encoding a color image signal, the ADCT (Adaptive Discrete Cosine Transformation) method of encoding is gaining popularity. This method is based on encoding by decomposing the image into its spatial frequency components, and is one of the known orthogonal transformation encoding methods.

The ADCT encoding is also adopted by the JPEG (Joint Photographic Expert Group) established as an international standard organization for such encoding methods, and the ADCT is gaining popularity as the orthogonal transformation most suitable for encoding image information.

The encoding and decoding by ADCT are in general conducted in the following manner.

The transformation of two-dimensional frequency components is executed in a unit block of 8 ×8 pixels, since such transformation for the entire picture requires an excessively long time.

The ADCT is conducted for each block to obtain ADCT coefficients in an 8×8 matrix, in which the coefficients at the right side, lower side and lower right area respectively signify the high frequency components in the horizontal, vertical and diagonal directions, and the coefficient at the upper left corner indicates the DC component.

Then said ADCT coefficients are quantized, rougher in the higher frequency side and finer in the lower frequency side, with weighting on the quantizing levels for the ADCT coefficients based on the human visual characteristics.

Then thus quantized ADCT coefficients are encoded. Since the components are concentrated in the lower frequency side, the encoding is conducted by zigzag scanning between the high and low frequency components. The significant coefficients with non-zero quantized outputs are grouped according to their values, and Haffman encoding is executed on a set of an identification number for the group, an immediately preceding significant coefficient, and a number positioned therebetween and indicating the run length of insignificant coefficients with zero quantized outputs, followed by the addition of a same-length code identifying the value in the group.

Since the diagonal high frequency components generally have low probability in an image, the latter portion after zigzag scanning is expected to become all zero in most cases. Consequently, a very high compression rate can be expected in the variable length code obtained in this manner, and an image reproduction with minimal deterioration in image quality can be achieved if a compression rate of several to one is anticipated in average.

However, the transmission channel generally has a fixed transmission capacity per unit time, and, if a picture has to be transmitted within a predetermined period as in the case of transmitting a moving image, it is desirable that the obtained code has a fixed number of bits (transfer rate) for a picture or for a unit pixel block.

The number of bits per picture is determined by a control coefficient C, which determines the coarseness of quantization. Thus, the control coefficient C is an important parameter for determining the transfer rate of an image and the quality thereof.

Various methods have been proposed for determining the control coefficient C.

For each frame of image data compressed as explained above, the control coefficient C employed in the quantization of image data is attached, and the inverse quantization is conducted with the control coefficient C at the reproduction of the compressed image data, whereby the image is reproduced through a process exactly inverse to the encoding process.

Thus, in the conventional art, the information for control coefficient C for quantization is attached to the image information of each frame.

The coefficient information, being an extremely important parameter for determining the quantization characteristics of the image and thus influencing the image quality, may destruct the quantization properties of an image frame and provide a visually unpleasant image if an error is involved in the information, for example in the transmission channel.

SUMMARY OF THE INVENTION

In consideration of the foregoing, the object of the present invention is to provide an encoding apparatus and a decoding apparatus capable of improving the reliability of image reproduction.

According to an embodiment of the present invention, there is provided an encoding apparatus comprising quantization means for quantizing image information; generation means for generating coefficient information for determining the quantizing steps in the quantization means; encoding means for variable length encoding of the data quantized by the quantization means; division means for dividing the image information of a picture into plural blocks; and transmission means for transmitting the obtained codes for each block divided by the division means, with the addition of said coefficient information.

Also according to another embodiment of the present invention, there is provided a decoding apparatus for reproducing image information from a data train, transmitted in unit of a data frame including a code which is obtained by quantizing image information and encoding thus quantized image data, and coefficient information relating to the quantizing steps determined for each picture, comprising decoding means for decoding the code; detection means for detecting an error in the coefficient information; and replacement means for replacing information in the data frame with that in another data frame, based on the output of the detection means.

Other objects of the present invention, and the advantages thereof, will become fully apparent from the following detailed description which is to be taken in conjunction with the accompanying drawings.

DETAILED DESCRIPTION OF THE PREFERRED EMBODIMENTS

In the following there will be explained an image transmission system, constituting a first embodiment of the present invention, with reference to FIGS. 1 to 5.

Figure 1:
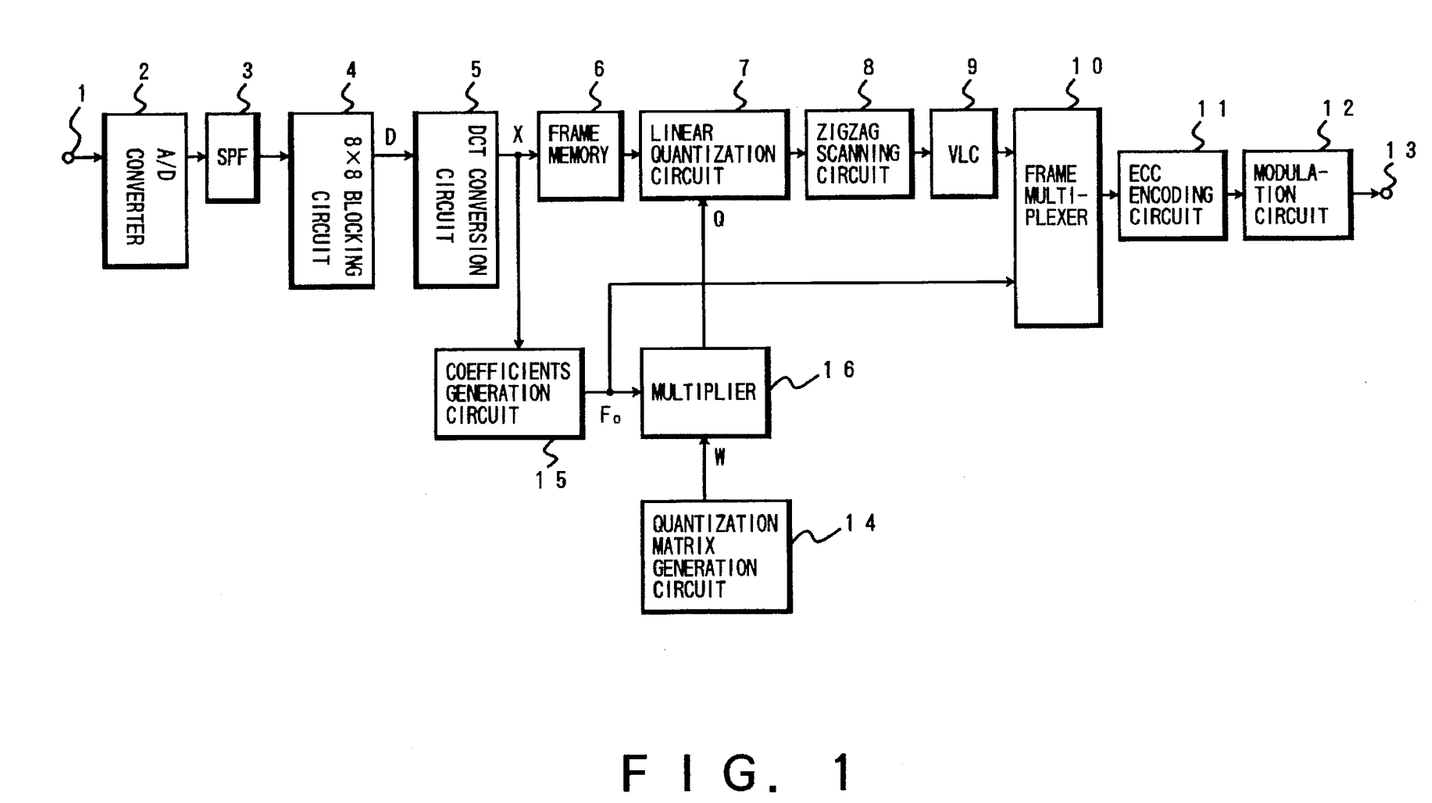
FIG. 1 is a block diagram of an image encoding apparatus constituting a first embodiment of the present invention.

Reference is made to FIG. 1, for explaining the configuration and function of an image encoding apparatus of the image transmission system.

An analog image signal, applied to an input terminal 1, is subjected to 8-bit digitization by an A/D converter 2.

The digitized image signal is provided to a two-dimensional spatial filter (SPF) 3, for eliminating high frequency components that cannot be processed in a DCT (Discrete Cosine Transformation) to be explained later. Thus, the filter 3 alleviates visual block distortion.

Subsequently the digital image signal is provided to a block dividing circuit 4, divided therein two-dimensionally into pixel blocks each consisting of 8×8 pixels, and is applied to the subsequent process in the unit of the pixel blocks.

The image signal from the block dividing circuit 4 is applied to a DCT circuit 5, which generates an 8×8 data matrix indicating the frequency components.

Figure 4A:
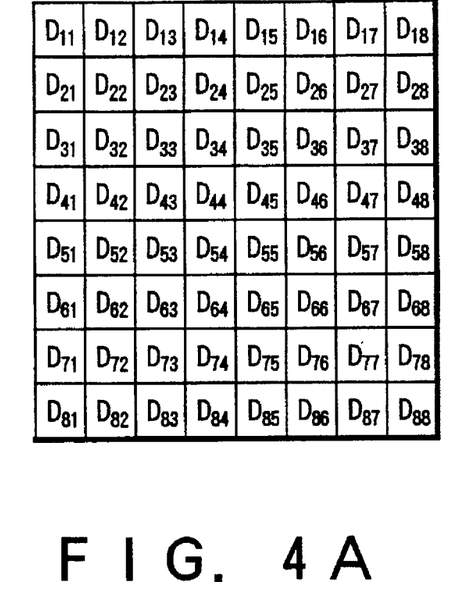
FIGS. 4A to 4D are diagrams showing the encoding process in the embodiments of the present invention.
Figure 4B:
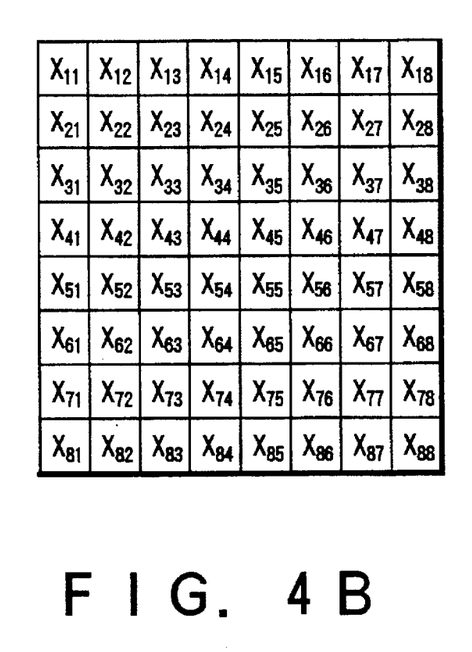
Figure 4C:
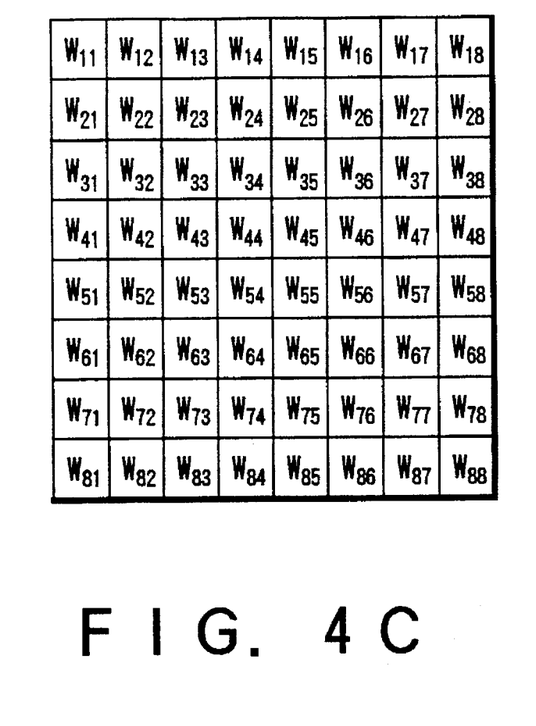

More specifically, a pixel block shown in FIG. 4A and consisting of image data $D_{11}$–$D_{88}$ is converted, by the DCT circuit 5, into a data matrix shown in FIG. 4B and consisting of data $X_{11}$–$X_{88}$.

The coefficient $X_{11}$ indicates the DC component in the horizontal and vertical directions in the pixel block, or, namely, the average value of this 8×8 pixel block.

The coefficients $X_{11}$–$X_{88}$, which are generally represented as $X_{ij}$, indicate components of higher frequency in the vertical direction for a larger value of i, and components of higher frequency in the horizontal direction for a larger value of j.

The data matrix generated by the DCT circuit 5 is applied to a frame memory 6 and a coefficient generation circuit 15.

A quantization matrix generating circuit 14 generates a quantization matrix $W_{11}$–$W_{88}$ (cf. FIG. 4C) indicating the weights of quantization step sizes for the DCT coefficients $X_{11}$–$X_{88}$, and the coefficient generation circuit 15 generates a control coefficient C to be explained later in more detail.

The quantization matrix $W_{11}$–$W_{88}$ and the control coefficient C are applied to a multiplier 16.

The multiplier 16 effects calculations $W_{ij} \times C = Q_{ij}$, and the outputs $Q_{11}$–$Q_{88}$ are applied to a linear quantization circuit 7 for determining the quantization steps thereof.

The linear quantization circuit 7 calculates $X_{ij}/Q_{ij}$ to generate outputs $G_{11}$–$G_{88}$. The quantized data $G_{11}$–$G_{88}$ are extracted in succession from the DC component, by means of a zigzag scanning circuit 8.

More specifically the zigzag scanning circuit 8 provides outputs in the order of $G_{11}$, $G_{12}$, $G_{21}$, $G_{31}$, $G_{22}$, $G_{13}$, $G_{14}$, $G_{23}$, $G_{32}$, $G_{41}$, ..., $G_{85}$, $G_{86}$, $G_{77}$, $G_{68}$, $G_{78}$, $G_{87}$ and $G_{88}$ to a variable length encoding circuit (VLC) 9.

The variable length encoding circuit 9 effects Huffman encoding by calculating a predicted value, for example on the DC component $G_{11}$, among the nearby pixel blocks and encoding the error to the predicted value.

However, the transmission channel generally has a fixed transmission capacity per unit time, and it is desirable that the obtained code has a fixed number of bits per each picture or per each pixel block in case a picture is to be transmitted during every predetermined period, as in the case when transmitting a moving image.

The number of bits is determined by the control coefficient C generated by the coefficient generation circuit 15.

More specifically, if the control coefficient C selected is larger, the probability of $G_{ij}=0$ becomes larger, so that the total number of bits NB (transfer rate) of the encoded data decreases. The relationship between the control coefficient C and the total number of bits NB, though variable depending on the image, is a simply decreasing function in any case, and is already known to assume the form of a logarithmic curve as shown in FIG. 4D for average images.

Figure 4D:
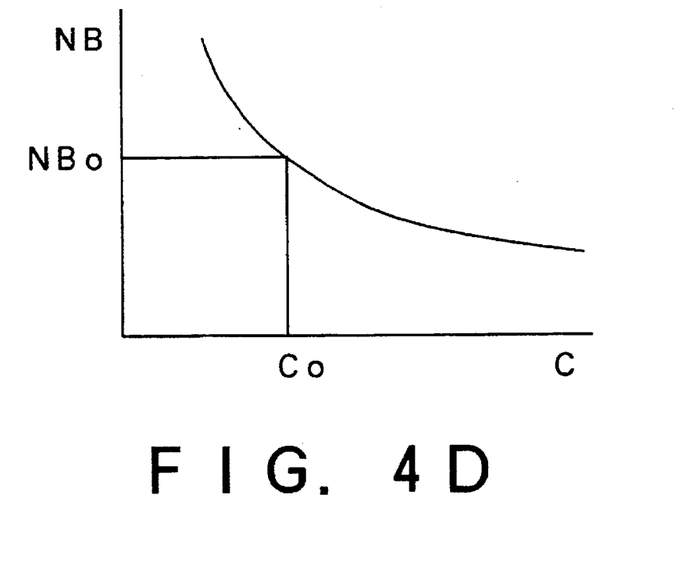

Therefore, the coefficient $C_0$ for obtaining a desired total number of bits $NB_0$ can be predicted, by effecting the encoding with a coefficient $C_1$, determining the total number of bits $NB_1$ of thus obtained code, and calculating the predicted value of $C_0$ based on $NB_1$ and $C_1$, utilizing a fact that the logarithmic curve shown in FIG. 4D passes through a point ($C_1$, $NB_1$).

Figure 5:
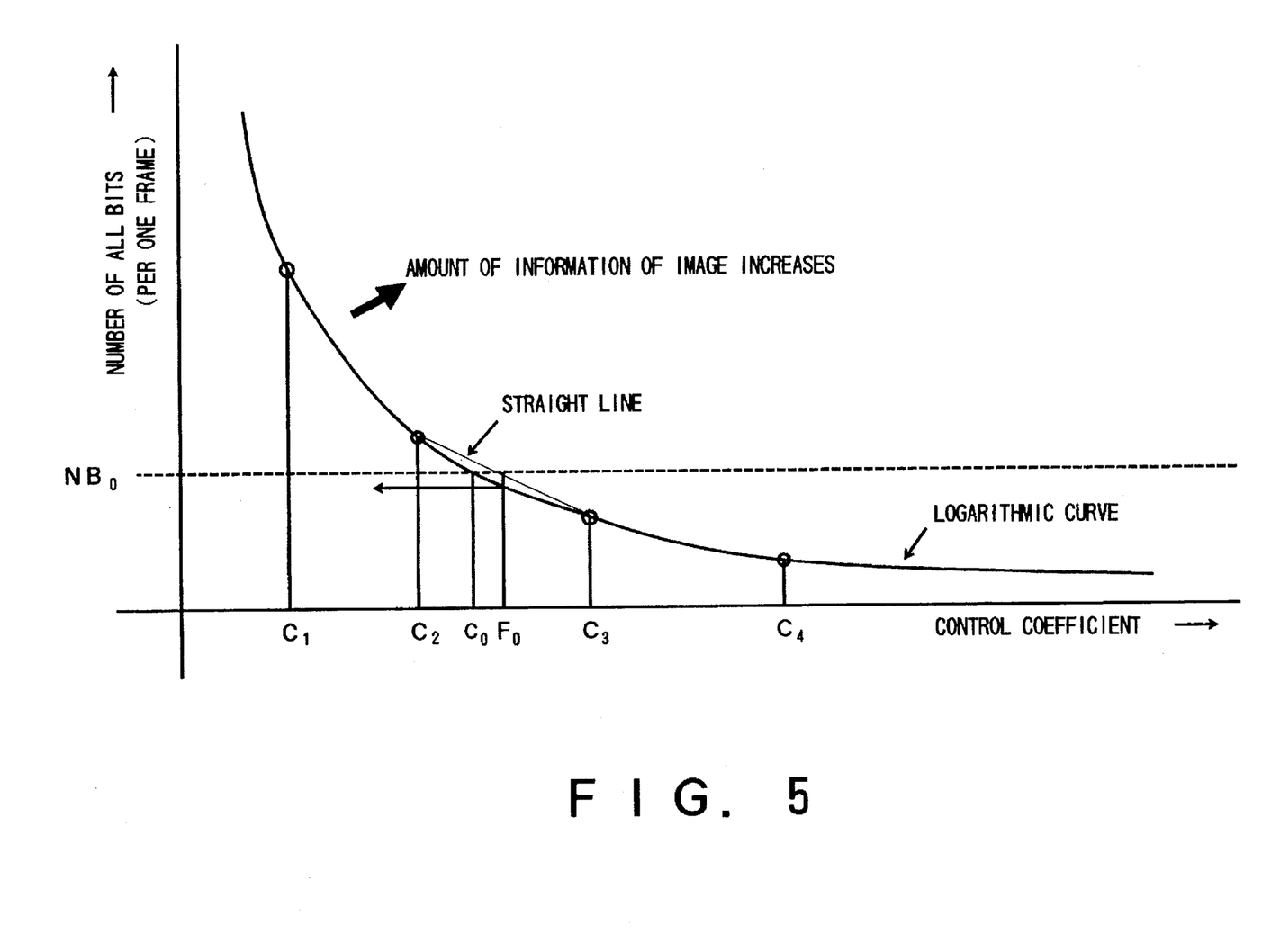
FIG. 5 is a graph showing the method of setting a control coefficient for determining an image transfer rate in the embodiments of the present invention.

In the present embodiment, the coefficient $C_0$ is predicted in the coefficient generation circuit 15, as will be explained in relation to FIG. 5.

At first certain control coefficients are selected. The data compressions are simultaneously executed, respectively with the coefficients, and the total number of bits per frame is calculated for each coefficient.

Then a range of coefficients providing the desired total number of bits is looked for ($C_2$ and $C_3$ the case of FIG. 5), and a coefficient $C_0$ providing the desired total number of bits is determined by linear approximation from the two points of the range.

Though a coefficient $F_0$ determined in this manner is somewhat different from the true coefficient $C_0$, it is optimum in that the obtained number of bits never exceeds the desired number of bits since the logarithmic curve is convex downwards.

The coefficient $F_0$ thus determined and the variable length encoded image signal from the VLC 9 (FIG. 1) are applied to a frame multiplexer 10, which attaches the information of the control coefficient $F_0$ to the image signal.

Figure 3:
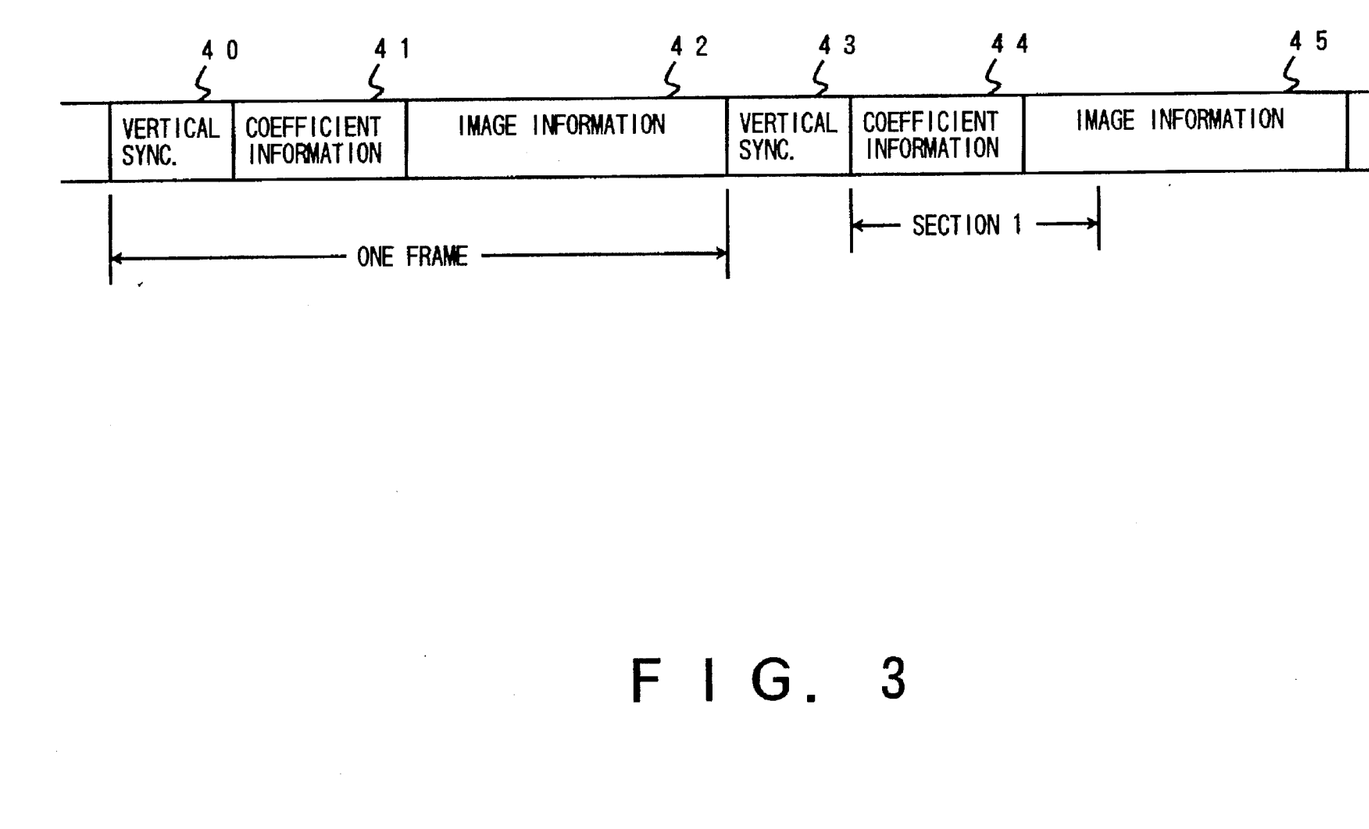
FIG. 3 is a diagram showing the format of a transmitted signal in the first and second embodiments of the present invention.

The format of the transmission signal released from the frame multiplexer 10 is shown in FIG. 3.

In FIG. 3 there are shown vertical synchronization codes 40 and 43; control coefficient information 41 and 44 of successive frames, containing the information of the coefficient $F_0$ in the present embodiment; and variable length encoded image information 42 and 45.

The transmission signal from the frame multiplexer 10 is error correction encoded in an error correction encoding (ECC) circuit 11, then modulated in a modulation circuit 12 according to the characteristics of the transmission channel, and is provided to an output terminal 13.

Figure 2:
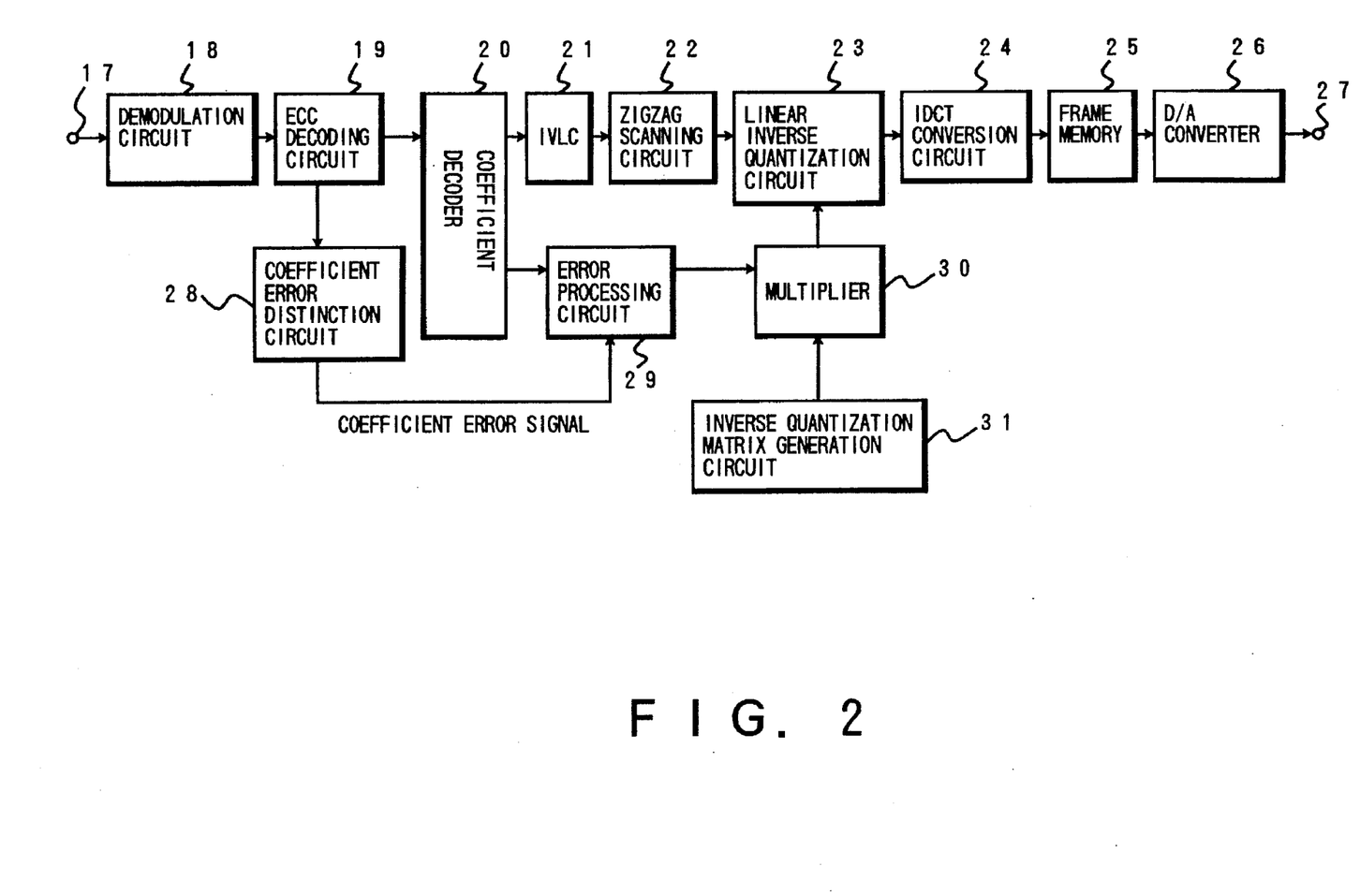
FIG. 2 is a block diagram of an image decoding apparatus of the first embodiment of the present invention.

Now reference is made to FIG. 2, for explaining the configuration and function of an image decoding apparatus of the image transmission system constituting the 1st embodiment.

The transmission signal (data train) from the transmission channel is applied to an input terminal 16, and is demodulated in a demodulation circuit 18, and is supplied to an error correction code (ECC) decoding circuit 19.

The ECC decoding circuit 19 corrects the code errors in the transmitted data train, according to a predetermined algorithm.

Also in case there are generated data for which the error correction identified is impossible, an error flag released for each error correction code word is set at "1", and the error flag is applied to a coefficient error discrimination circuit 28.

The coefficient error discrimination circuit 28 discriminates whether the code word with the error flag "1" contains the coefficient information, and, if such coefficient information is contained, sets a coefficient error signal, released for each frame of the image information, at "1". The coefficient error signal is applied to an error process circuit 29.

The transmission signal, subjected to the error correction in the ECC decoding circuit 19, is applied to a coefficient decoder 20, and is separated therein into the image information and the coefficient information.

The coefficient information, separated in the coefficient decoder 20, is applied to the error process circuit 29, which transmits the coefficient information to a multiplier 30 in case the coefficient error signal provided by the coefficient error discrimination circuit 28 is not "1".

The image information separated in the coefficient decoder 20 is applied to an IVLC 21 for variable length decoding. A zigzag scanning circuit 22, a linear inverse quantization circuit 23, an inverse quantization matrix generation circuit 31 and an IDCT (Inverse Discrete Cosine Transformation) circuit 24 effect a process exactly inverse to the process executed by the zigzag scanning circuit 8, the linear quantization circuit 7, the quantization matrix generation circuit 14 and the DCT circuit 5 in the encoding apparatus shown in FIG. 1.

The image information subjected to the above-explained process is buffered in a frame memory 25, is then converted into an analog signal in a D/A converter 26, and provided to an output terminal 27, for provision to an image display means such as a monitor unit.

On the other hand, in case the coefficient error signal, provided from the coefficient error discrimination circuit 28 to the error process circuit 29, is "1", the error process circuit 29 decodes the image information by replacing the coefficient information, attached to all the frames, with the coefficient information of the current frame.

In the following there will be explained, with reference to FIG. 3, the process in case the coefficient information contains an error.

It is assumed that an error is generated in the transmission signal shown in FIG. 3 on the transmission channel and that the ECC decoding circuit 19 shown in FIG. 2 sets the error flag as "1" in a section 1 shown in FIG. 3. The error flag is set at "1" for a code word for which the error correction is not possible, and the error flag is applied to the coefficient error discrimination circuit 28, which discriminates whether the code word with the error flag "1" contains the coefficient information.

Since the section 1 contains the coefficient information 44, the coefficient error discrimination circuit 28 supplies the error process circuit 29 with a coefficient error signal "1" for the image information of a frame, corresponding to the coefficient information 44.

In response to the coefficient error signal "1" from the coefficient error discrimination circuit 28, the error process circuit 29 disregards the coefficient information 44, and effects the decoding of the image information 45 by supplying the multiplier 30 with the coefficient information 41 used in the decoding of a preceding frame.

In the following there will be given a detailed explanation of a second embodiment of the image transmission system.

In the second embodiment, the configuration and function of the image encoding apparatus are the same as those in the first embodiment, and will not, therefore, be explained.

Figure 6:
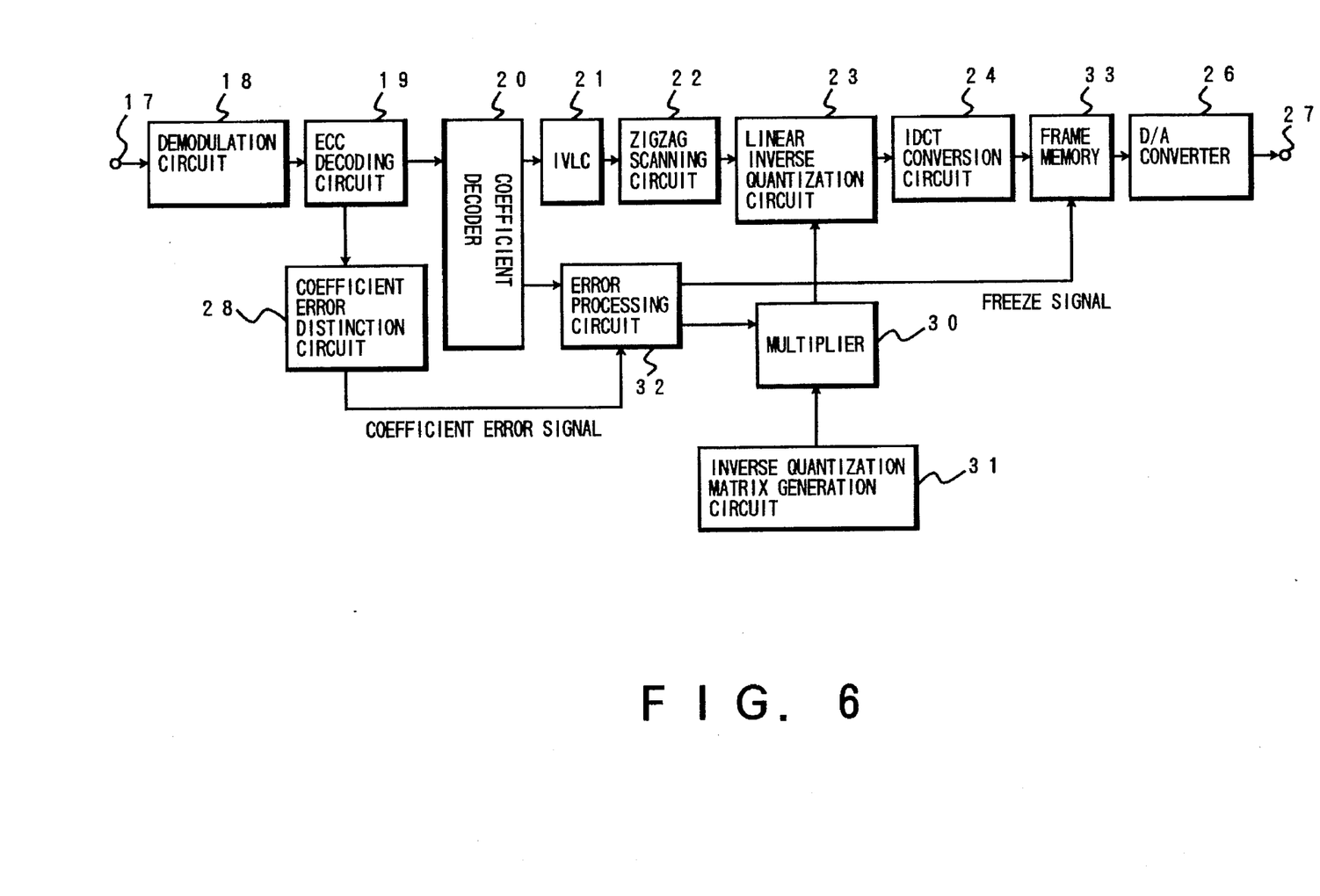
FIG. 6 is a block diagram of an image decoding apparatus constituting a second embodiment of the present invention.

Now reference is made to FIG. 6 for explaining the configuration and function of an image decoding apparatus in the second embodiment. In FIG. 6, components the same as or equivalent to those in FIG. 2 are represented by the same numbers and will not be explained further in the following description. Also the functions of the apparatus are the same as those in the first embodiment, except for the process in case an error is generated in the coefficient information. Such process will be explained in the following description.

In case the coefficient error signal, provided by the coefficient error discrimination circuit 28 to an error process circuit 32, is "1", the image of the preceding frame is frozen.

More specifically, the error process circuit 32 sends a freeze signal to the frame memory 33, which in response to the freeze signal for again releasing the image information of the preceding frame.

More specifically, with reference to FIG. 3, in case the coefficient error signal is "1", the error process circuit 32 sends a freeze signal to the frame memory 33, for disregarding the coefficient information 44 and the image information 45 and for again releasing the image of the preceding frame, namely the image regenerated from the information 42.

In response the frame memory 33 again sends the image of the preceding frame to the D/A converter for output from the output terminal 27.

In the following there will be given a detailed explanation on a third embodiment of the image transmission system of the present invention, with reference to FIGS. 7 to 10.

Figure 7:
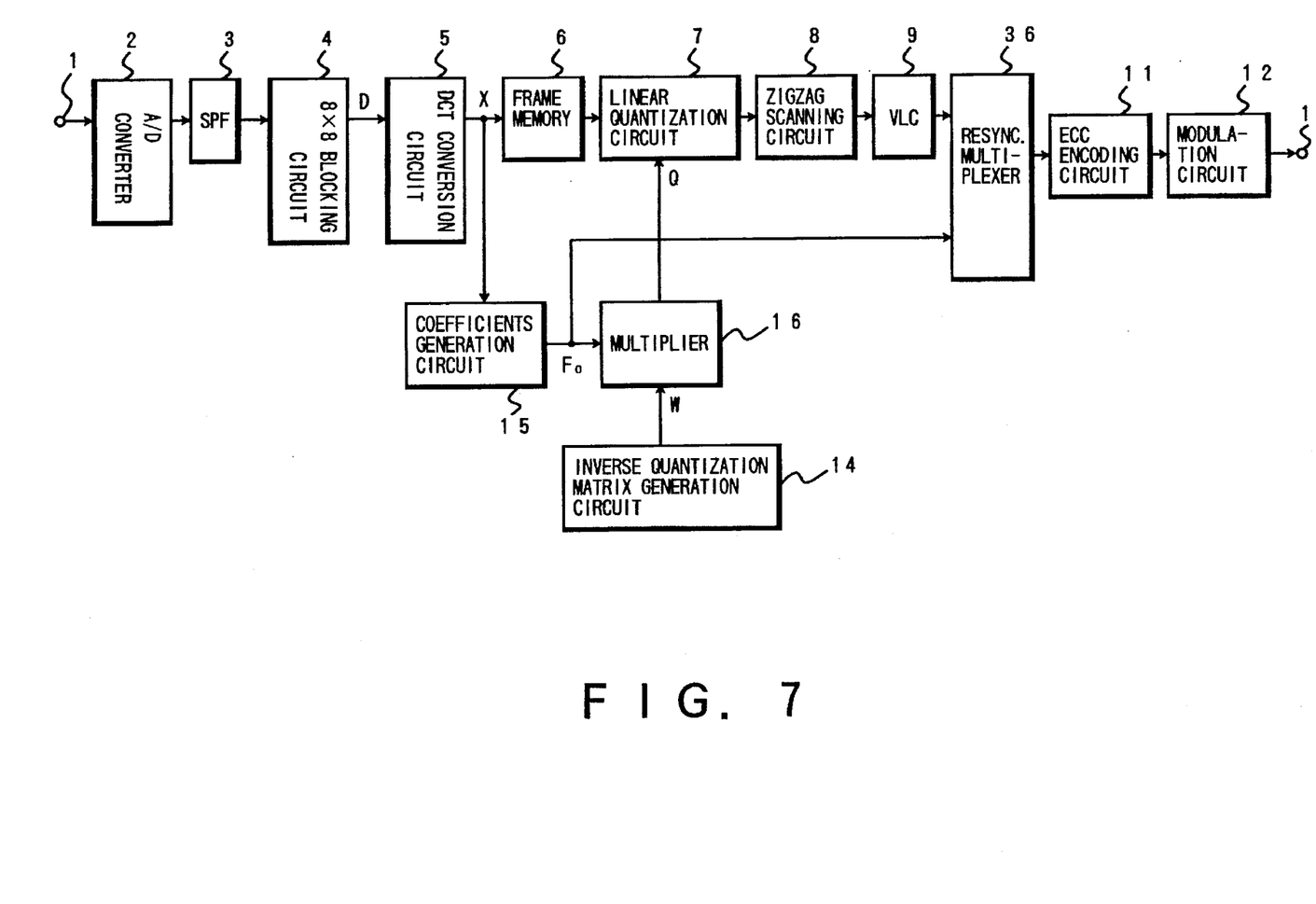
FIG. 7 is a block diagram of an image encoding apparatus constituting a third embodiment of the present invention.

Reference is made to FIG. 7 for explaining the configuration and function of an image encoding apparatus, constituting the third embodiment of the image transmission system. In FIG. 7, components which are the same as or equivalent to those in FIG. 1 are represented by same numbers and will not be explained further.

The third embodiment is the same as the first embodiment, except for the process of attaching the coefficient $F_0$, provided by the coefficient generation circuit 15, to the image signal from the VLC 9 by the frame multiplexer 10 (FIG. 1).

The attaching of the coefficient $F_0$ to the image signal is conducted in the following manner.

The coefficient $F_0$ from the coefficient generation circuit 15 and the variable length encoded image signal, from the VLC 9, are applied to a re-synchronization multiplexer 36, which divides a frame into plural areas and attaches information of the coefficient $F_0$ to the image signal of each of the divided areas.

The divided area will hereinafter be called a re-sync block. The relation of re-sync blocks in a frame will be explained in the following description, with reference to FIG. 9.

Figure 9:
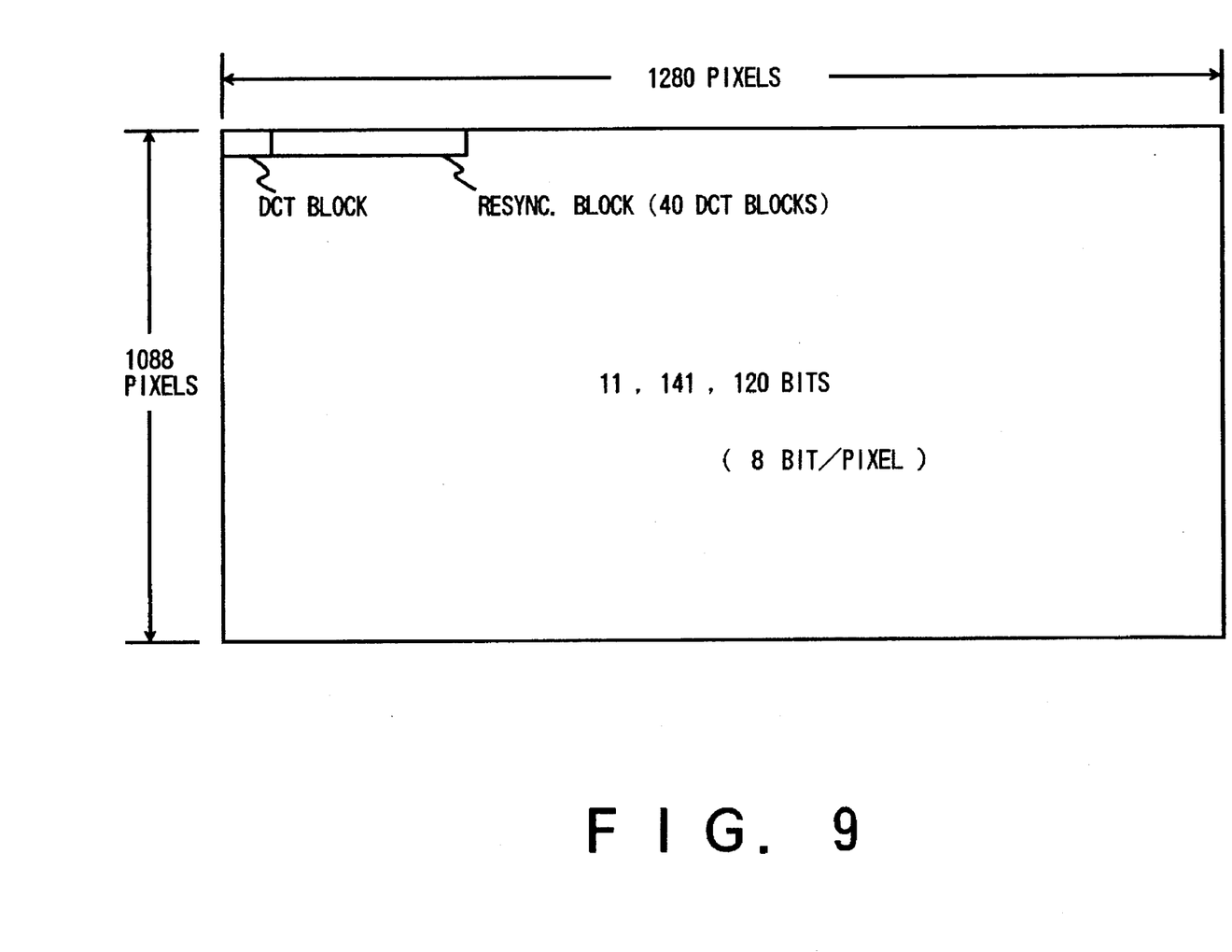
FIG. 9 is a diagram showing the structure of a frame in the third embodiment of the present invention.

In FIG. 9, if the picture is composed of 1280 pixels in the horizontal direction and 1088 pixels in the vertical direction, and if each pixel is A/D converted to 8 bits, the data amount per picture is:

1280×1088×8=11,141,120 bits.

Since each DCT block is composed of 8 pixels in the horizontal and vertical directions with a predetermined amount of image data, a re-sync block is selected as composed of 40 DCT blocks.

Consequently a picture is composed of 544 re-sync blocks, which are arranged 4 in the horizontal direction and 136 in the vertical direction.

The data amount in each re-sync block is:

40×8×8×8=20,480 bits.

Figure 10:
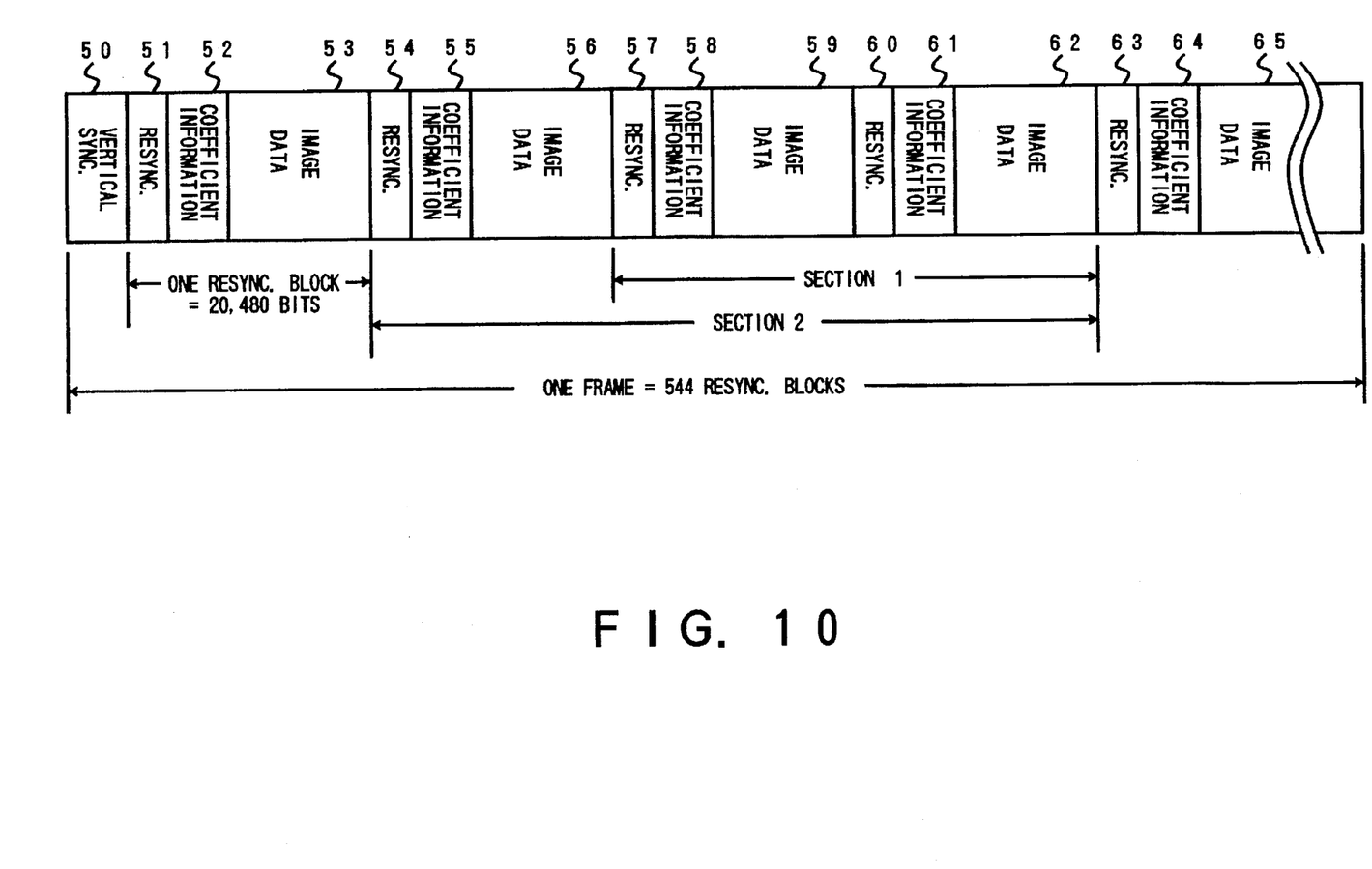
FIG. 10 is a diagram showing the format of transmitted signal in the third embodiment of the present invention.

The format of the transmission signal released from the re-sync multiplexer 36 is shown in FIG. 10. There are shown a vertical synchronization code 50; re-sync codes 51, 54, 57, 60, 63; coefficient information codes 52, 55, 58, 61, 64 for the coefficient $F_0$ released from the coefficient generation circuit 15; and variable length encoded image data 53, 56, 59, 62, 65. Except for the above-explained process, the processes of the third embodiment are the same as those of the 1st embodiment.

Figure 8:
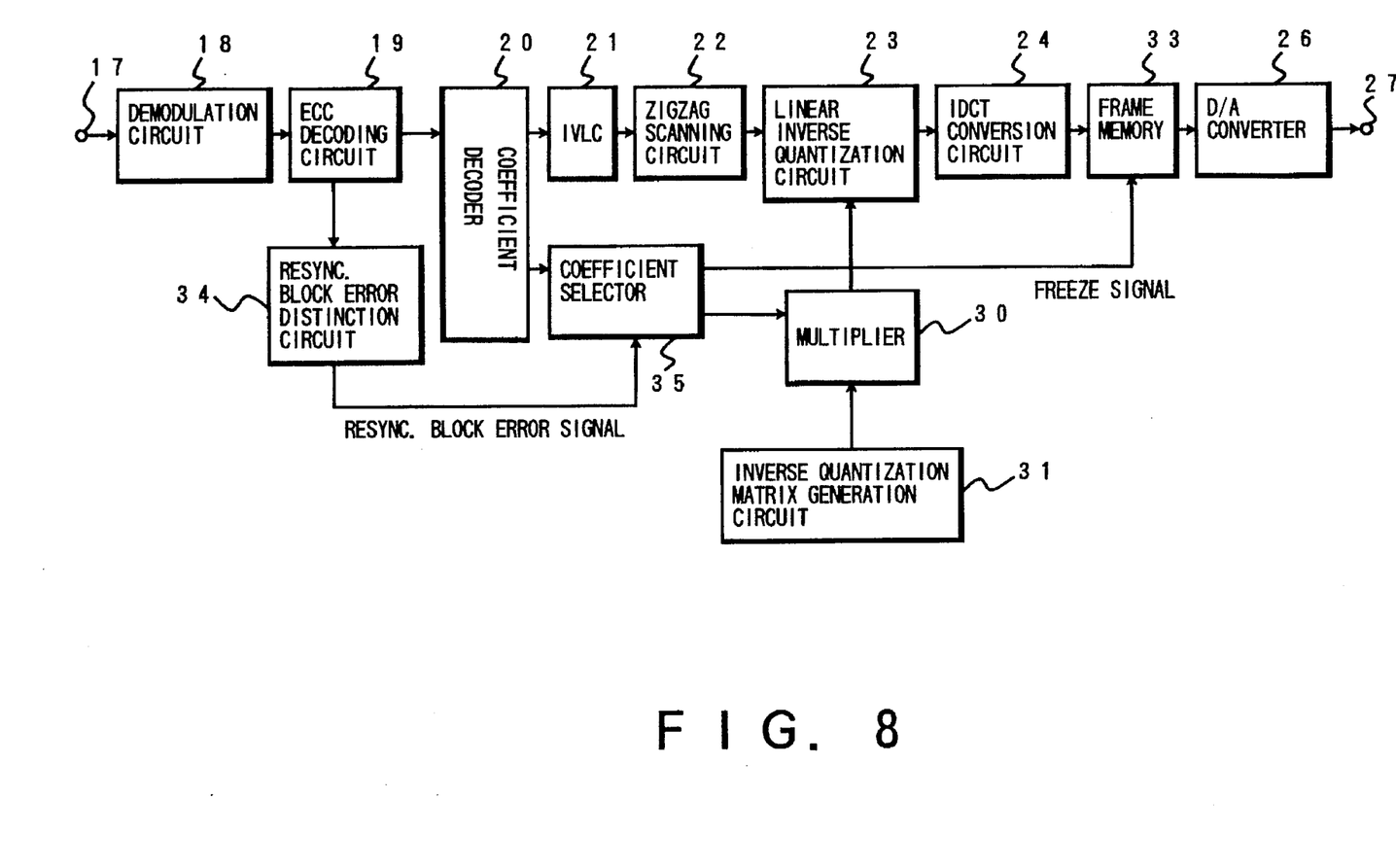
FIG. 8 is a block diagram of an image decoding apparatus of the third embodiment of the present invention.

Now reference is made to FIG. 8 for explaining the configuration and function of an image decoding apparatus in the third embodiment, wherein components the same as or equivalent to those in FIG. 2 or 6 are represented by the same numbers.

The transmission signal (data train) from the transmission channel is applied to the input terminal 17, demodulated by the demodulation circuit 18 and applied to the ECC decoding circuit 19.

The ECC decoding circuit 19 corrects the code errors in the transmitted data train, according to a predetermined algorithm.

In case there are generated data for which an error correction is identified as impossible, an error flag released for each error correction code word is set at "1", and the error flag is applied to a re-sync block error discrimination circuit 34.

The re-sync error discrimination circuit 34 discriminates a block containing the coefficient information, of which code words has the error flag "1", and, if such block containing the coefficient information is present, sets a re-sync block error signal, released for each re-sync block of the image information, at "1". The re-sync block error signal is provided to a coefficient selector 35.

The transmission signal, subjected to the error correction in the ECC decoding circuit 19, is applied to the coefficient decoder 20, and is separated therein into the image information signal and the coefficient information signal.

The coefficient information, separated in the coefficient decoder 20, is provided to the coefficient selector 35, which transmits the coefficient information to the multiplier 30 in case the re-sync block error signal "1" is not provided by the re-sync block error discrimination circuit 34.

The image information separated in the coefficient decoder 20 is provided to the IVLC 21 for variable length decoding. The zigzag scanning circuit 22, the linear inverse quantization circuit 23, the inverse quantization matrix generation circuit 31 and the IDCT (inverse discrete cosine transformation) circuit 24 effect a process exactly inverse to the process executed by the zigzag scanning circuit 8, the linear quantization circuit 7, the quantization matrix generation circuit 14 and the DCT circuit 5 in the encoding apparatus shown in FIG. 1.

The image information subjected to the above-explained process is buffered in the frame memory 33, then converted into an analog signal in the D/A converter 26, and provided from the output terminal 27, for provision to image display means such as a monitor unit.

On the other hand, in case the re-sync block error signal "1" is provided to the coefficient selector 35, the selector 35 disregards the coefficient information signal attached to the incorrectible re-sync block, and replaces the information signal with coefficient information attached to a re-sync block preceding or succeeding to the incorrectible re-sync block.

Also in case a frame contains three or more incorrectible re-sync blocks, the frame currently processed is disregarded, and a preceding or succeeding frame is frozen.

More specifically, the coefficient selector 35 is provided therein with a re-sync block counter, and provides a freeze signal to the frame memory 33 in case the number of error re-sync blocks within a frame exceeds a certain threshold value, and, in response the frame memory 33 does not release the image information of the current frame, but releases image information a preceding or succeeding frame, thereby replacing the image information of the current frame.

Now reference is made to FIG. 10 for explaining the process in case the coefficient information, attached to each re-sync block, contains an error.

It is assumed that an error is generated, on the transmission channel, in the transmission signal shown in FIG. 10, whereby the ECC decoding circuit 19 shown in FIG. 8 sets the error flag at "1" in a section 1 shown in FIG. 10.

The error flag is set at "1" for a code word containing an incorrectible error. The error flag is applied to the re-sync block error discrimination circuit 34, which discriminates whether the code word with the error flag "1" contains the coefficient information.

In the section 1, for the image information of the re-sync block corresponding to the coefficient information 58 and 61, a re-sync block error signal "1" is entered into the coefficient selector 35.

In response to the re-sync block error signal, the coefficient selector 35 disregards the coefficient information 58 and 61 in the section 1, and provides the multiplier 30 with the coefficient information attached to the preceding re-sync block, for example the coefficient information 55.

Also as explained above, the coefficient selector 35 is provided with a re-sync block error counter, and, in case the number of error re-sync blocks exceeds a certain threshold value, the image of the frame is considered unreliable and is replaced by the image of the preceding frame. In the present embodiment, the threshold value is selected as two.

More specifically with reference to FIG. 10, if an error flag is set in section 2, the number of error re-sync block is considered as three, since section 2 contains the re-sync information 54, 57, 61. Thus the coefficient selector 35 sends a freeze signal to the frame memory 33, thereby freezing the image of the preceding frame.

As explained in detail in the foregoing, in the image signal encoding apparatus and the decoding apparatus of the present invention, if an error is generated, for example on the transmission channel, in the control coefficient information which is an extremely important parameter affecting the image quality, the image reproduction is conducted by disregarding such coefficient information involving error and replacing it with effective coefficient information. It is therefore rendered possible to minimize the influence of the error in the coefficient information, and to improve the reliability of image reproduction.

Also the present invention is subject to various modifications within the scope and spirit thereof.

For example, in the foregoing embodiments, the coefficient information or the image information is replaced by the previously processed information, but it may naturally be replaced by the subsequent coefficient or image information.

In other words, the foregoing description of embodiments has been given for illustrative purposes only and not to be construed as imposing a limitation in any respect.

The scope of the invention is, therefore, to be determined solely by the following claims and not limited by the text of the specification and modifications made within a scope equivalent to the scope of the claims fall within the true spirit and scope of the invention.

What is claimed is:

1. An encoding apparatus comprising:
   a) block forming means for forming blocks of sampled values of an input signal;
   b) determination means for determinating control information for controlling quantization steps, on a unit basis of n blocks;
   c) quantization means for quantizing the blocks of the input signal on the basis of the control information determined by said determination means;
   d) coding means for coding quantized data provided by said quantization means, on a unit basis of the block; and
   e) adding means for adding the control information to coded data provided by said coding means, on a unit basis of m blocks, wherein n and m are integers and n is greater than m.

2. An apparatus according to claim 1, further comprising orthogonal conversion means for orthogonal-converting the blocks of the input signal, formed by said block forming means, and
   wherein said quantization means quantizes the input signal orthogonal-converted by said orthogonal conversion means.

3. An encoding apparatus comprising:
   (a) transforming means for orthogonal transforming image data on a unit basis of a block, said block comprising a predetermined number of pixels;
   (b) quantizing means for quantizing the image data transformed by said transforming means, on unit basis of the block;
   (c) generation means for generating a quantizing step data for controlling a quantizing value of the image data transformed by said transforming means to be quantized by said quantizing means, on a unit basis of n blocks;
   (d) encoding means for encoding the image data quantized by said quantizing means; and
   (e) adding means for adding the quantization step data to the image data encoded by said encoding means, on a unit basis of m blocks, wherein n and m are integers and n is grater than m.

4. An apparatus according to claim 3, further comprising transmitting means for transmitting data output by said adding means.

5. An apparatus according to claim 3, wherein said transforming means effects discrete consine transformation.

6. A decoding apparatus for reproducing image data from a data train transmitted in a unit of a transmission frame containing a code obtained by quantizing the image data and encoding thus quantized image data, and quantizing steps information relating to the steps of the quantization of the image data and being determined for each image data, comprising:
   a) decoding means for decoding the code;
   b) detection means for detecting an error occurring in the quantizing steps information; and
   c) replacement means for replacing information in the transmission frame with information of another transmission frame, based on the output of said detection means.

7. An apparatus according to claim 6, wherein said image data is data converted into frequency components.

8. An apparatus according to claim 6, wherein the transmission frame contains image data of a picture and the quantizing steps information determined for each image data.

9. An apparatus according to claim 6, wherein the image data of a picture is composed of a plurality of transmission frames.

10. A decoding apparatus for reproducing image data from a data train transmitted in the unit of a transmission frame containing codes the codes being obtained by converting the image data into frequency components, quantizing thus converted data and variable length encoding the quantized data, and quantizing steps information relating to the quantizing steps of the codes, comprising:
   a) decoding means for decoding the codes;
   b) detecting means for detecting the error occurring in the quantizing steps information; and
   c) replacement means for replacing the image data in the transmission frame with image data of a transmission frame in another picture.

11. An apparatus according to claim 10, wherein the transmission frame contains image data of a picture and the quantizing steps information determined in a unit of a picture.

12. A decoding apparatus for decoding encoded data obtained by quantizing image data, encoding the quantized data and adding quantizing steps information relating to the steps of the quantization to the image data to each of plural blocks divided from the encoded data, comprising:
   a) detecting means for detecting error occurring in the quantizing steps information in each of the blocks; and
   b) replacement means for replacing the quantizing steps information of a block in which an error is detected by the detecting means, with the quantizing steps information of another block.

13. An apparatus according to claim 12, wherein said image data is data converted into frequency components.

14. An apparatus according to claim 13, wherein the quantizing steps information is determined in a unit of a picture.

15. An apparatus according to claim 14, wherein said replacement means is adapted to replace with another block in the same picture.

16. An apparatus according to claim 15, wherein said replacement means is adapted, in case the number of blocks detected by said detection means within a frame exceeds a predetermined number, to replace said frame with another frame.

17. A decoding apparatus for decoding a signal encoded by an encoding apparatus comprising first orthogonal transformation means for effecting orthogonal transformation on an input signal, quantization means for quantizing the orthogonally transformed signal, generation means for generating a control coefficient for controlling a quantizing value of the orthogonally transformed signal to be quantized by said quantization means, encoding means for variable length encoding of the signal quantized by said quantization means, and transmission means for transmitting the encoded signal with addition of the control coefficient, comprising:

a) decoding means for obtaining a decoded signal by decoding the encoded signal;

b) separation means for separating the control coefficient added to the encoded signal from the decoded signal;

c) detection means for detecting an error occurring in the separated control coefficient;

d) generation means for generating another control coefficient different from the control coefficient, according to the output of said detection means;

e) inverse quantization means for inverse quantization of the decoded signal, according to the control coefficient generated by said generation means; and f) second orthogonal transformation means for effecting an orthogonal transformation, which is an inverse transformation of the first orthogonal transformation, on the signal inversely quantized by said inverse quantization means.

18. An apparatus according to claim 17, wherein said first orthogonal transformation means is adapted to effect discrete cosine transformation.

19. An apparatus according to claim 18, wherein said control coefficient is attached to each re-synchronization block composed of plural DCT blocks.

20. A decoding apparatus for decoding encoded data obtained by quantizing image data, encoding the quantized data and adding quantizing steps information relating to steps of the quantization of the image data to each of plural blocks divided from the encoded data, comprising:

a) detection means for detecting error occurring in the quantizing steps information in each of the blocks; and b) replacement means for replacing, in case the number of blocks detected by said detection means exceeds a predetermined number within a frame, the frame with another frame.

21. An apparatus according to claim 20, wherein the quantizing steps information is determined on a unit basis of a predetermined number of blocks.

22. A transmission method comprising steps of:

forming blocks of sampled values of an input data;

determining control information for controlling quantization steps on a unit basis of n blocks;

quantizing the n blocks on the basis of the determined control information;

coding quantized data provided in the quantization step, on a unit basis of the block; and transmitting coded data provided in the coding step, by adding the control information to the coded data on a unit basis of m blocks, wherein m and n are integers and n is greater than m.

23. A decoding method of reproducing image data form a data train transmitted in a unit of a transmission frame containing a code obtained by quantizing the image data and encoding thus quantized image data, and quantizing steps information relating to the steps of the quantization of the image data and being determined for each image data, comprising:

a) a decoding step of decoding the code;

b) a detection step of detecting an error occurring in the quantizing steps information; and c) a replacement step of replacing information in the transmission frame with information of another transmission frame, based on the result of said detection step.

24. A decoding method of reproducing image data form a data train transmitted in the unit of a transmission frame containing codes, the codes being obtained by converting the image data into frequency components, quantizing thus converted data and variable length encoding the quantized data, and quantizing steps information relating to the quantizing steps of the codes, comprising:

a) a decoding step of decoding the codes;

b) a detecting step of detecting the error occurring in the quantizing steps information; and c) a replacement step of replacing the image data in the transmission frame with image data of a transmission frame in another picture.

25. A decoding method of decoding encoded data obtained by quantizing image data, encoding the quantized data and adding quantizing steps information relating to the steps of the quantization to the image data to each of plural blocks divided from the encoded data, comprising:

a) detecting step of detecting an error occurring in the quantizing steps information in each of the blocks; and b) a replacement step of replacing the quantizing steps information of a block in which an error is detected by said detecting means, with the quantizing steps information of another block.

26. A decoding method of decoding encoded data obtained by quantizing image data, encoding the quantized data and adding quantizing steps information relating to steps of the quantization of the image data to each of plural blocks divided from the encoded data, comprising:

a) a detecting step of detecting an error occurring in the quantizing steps information in each of the blocks; and b) a replacement step of replacing, in case the number of blocks detected by said detection means exceeds a predetermined number within a frame, the frame with another frame.

* * * * *

UNITED STATES PATENT AND TRADEMARK OFFICE
CERTIFICATE OF CORRECTION

PATENT NO. : 5,657,399

DATED : August 12, 1997

INVENTORS : YOSHITSUGU IWABUCHI ET AL.   Page 1 of 2

It is certified that error appears in the above-identified patent and that said Letters Patent is hereby corrected as shown below:

In the Drawings:

SHEET 2 OF 11

FIG. 2, "DISTINCTION" should read --DISCRIMINATION--.

SHEET 7 OF 11

FIG. 6, "DISTINCTION" should read --DISCRIMINATION--.

SHEET 9 OF 11

FIG. 8, "DISTINCTION" should read --DISCRIMINATION--.

COLUMN 1

Line 35, "said" should read --the--;
   Line 44, "Haffman" should read --Huffman--.

COLUMN 6

Line 28, "in response" should read --responds--.

COLUMN 7

Line 46, "has" should read --have--.

UNITED STATES PATENT AND TRADEMARK OFFICE
CERTIFICATE OF CORRECTION

PATENT NO. : 5,657,399

DATED : August 12, 1997

INVENTORS : YOSHISUGA IWABUCHI ET AL.

It is certified that error appears in the above-identified patent and that said Letters Patent is hereby corrected as shown below:

COLUMN 8

Line 13, "to" should be deleted.

COLUMN 9

Line 65, "consine" should read --cosine--.

COLUMN 10

Line 24, "codes" (1st occurrence) should read --codes,--.

COLUMN 12

Line 2, "form" should read --from--;
Line 18, "form" should read --from--.

Signed and Sealed this

Third Day of March, 1998

Attest:

BRUCE LEHMAN

Attesting Officer

Commissioner of Patents and Trademarks